(12) United States Patent
Kawai

(10) Patent No.: US 8,307,083 B2
(45) Date of Patent: Nov. 6, 2012

(54) IMAGE FORMATION SYSTEM, IMAGE FORMATION DEVICE, SERVER DEVICE AND PROGRAM

(75) Inventor: Sunao Kawai, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1194 days.

(21) Appl. No.: 11/360,767

(22) Filed: Feb. 24, 2006

(65) Prior Publication Data

US 2006/0195596 A1    Aug. 31, 2006

(51) Int. Cl.
G06F 15/16    (2006.01)

(52) U.S. Cl. .......... 709/225; 709/229; 358/1.15

(58) Field of Classification Search .......... 358/1.15; 709/225, 229; 726/7
See application file for complete search history.

(56) References Cited

U.S. PATENT DOCUMENTS

| | | | | |
|---|---|---|---|---|
| 6,163,383 | A * | 12/2000 | Ota et al. ............ | 358/1.14 |
| 6,202,092 | B1 | 3/2001 | Takimoto | |
| 6,545,767 | B1 * | 4/2003 | Kuroyanagi ............ | 358/1.14 |
| 6,597,469 | B1 * | 7/2003 | Kuroyanagi ............ | 358/1.15 |
| 7,025,260 | B1 * | 4/2006 | Stevens et al. ............ | 235/382 |
| 7,062,651 | B1 * | 6/2006 | Lapstun et al. ............ | 713/168 |
| 7,296,298 | B2 * | 11/2007 | Salgado ............ | 726/30 |
| 7,382,487 | B2 * | 6/2008 | Ikegami ............ | 358/1.6 |
| 7,383,321 | B2 * | 6/2008 | Moyer et al. ............ | 709/219 |
| 7,400,427 | B2 * | 7/2008 | Honma ............ | 358/1.15 |
| 8,132,230 | B2 * | 3/2012 | Akita ............ | 726/2 |
| 2002/0059318 | A1 * | 5/2002 | Nomura et al. ............ | 707/200 |
| 2002/0097431 | A1 | 7/2002 | Ikegami | |
| 2003/0018900 | A1 | 1/2003 | Endoh | |
| 2003/0043405 | A1 | 3/2003 | Hill | |
| 2003/0053106 | A1 * | 3/2003 | Kuroda et al. ............ | 358/1.13 |
| 2004/0021890 | A1 * | 2/2004 | Hirai et al. ............ | 358/1.13 |

FOREIGN PATENT DOCUMENTS

| | | |
|---|---|---|
| CN | 1407493 A | 4/2003 |
| JP | 8-36470 | 2/1996 |
| JP | 10-161823 A | 6/1998 |
| JP | 11-157179 | 6/1999 |
| JP | 2002-063008 A | 2/2002 |

(Continued)

OTHER PUBLICATIONS

JP Office Action dtd Oct. 21, 2008, JP App. 2005-051839.
CN Office Action mailed Mar. 2, 2007, CN Appln. 200610057776.2.

(Continued)

*Primary Examiner* — Kevin Bates
(74) *Attorney, Agent, or Firm* — Banner & Witcoff, Ltd.

(57) ABSTRACT

An image formation system includes an image formation device and a server device connected with each other through a network. The image formation device includes an image formation executing unit that receives an image formation request from a terminal device through the network and executes the image formation a request source information transmitting unit that transmits request source information, which is included in the image formation request and identifies the request source of the image formation request, and an image formation restricting unit that restricts the image formation by the image formation executing unit when a restriction instruction is received from the server device. The server device includes a restriction instruction transmitting unit that causes the image formation unit to restrict in the image formation when a registration status of the request source information with respect to a database for storing the request source information satisfies a predetermined status.

21 Claims, 10 Drawing Sheets

| APPROVE ADDRESS | RESTRICTED NUMBER | CONSUMED NUMBER | RESTRICTION CONDITION 1 | RESTRICTION CONDITION 2 | RESTRICTION CONDITION 3 |
|---|---|---|---|---|---|
| 192.168.0.1 | 68 | 32 | Color | over 4Color | – |
| 192.168.0.2 | 50 | 0 | Inkjet | – | Photo |
| 192.168.10.1-192.168.10.100 | 425 | 75 | – | – | A3 |

FOREIGN PATENT DOCUMENTS

| | | |
|---|---|---|
| JP | 2002-083280 A | 3/2002 |
| JP | 2002-103743 A | 4/2002 |
| JP | 2002-222072 | 8/2002 |
| JP | 2003-330686 A | 11/2003 |
| JP | 2003-223307 A | 12/2003 |

OTHER PUBLICATIONS

JP Office Action dtd Jun. 3, 2008, JP App. 2005-51839 (partial translation).

EP Search Report, Oct. 13, 2006, EP Appln. 06251002.

* cited by examiner

| APPROVE ADDRESS | RESTRICTED NUMBER | CONSUMED NUMBER | RESTRICTION CONDITION 1 | RESTRICTION CONDITION 2 | RESTRICTION CONDITION 3 |
|---|---|---|---|---|---|
| 192.168.0.1 | 68 | 32 | Color | over 4Color | – |
| 192.168.0.2 | 50 | 0 | Inkjet | – | Photo |
| 192.168.10.1-192.168.10.100 | 425 | 75 | – | – | A3 |

FIG. 4

IMAGE FORMATION SYSTEM, IMAGE FORMATION DEVICE, SERVER DEVICE AND PROGRAM

CROSS-REFERENCE TO RELATED APPLICATION

This application is related to Japanese Patent Applications No. 2005-51839, filed on Feb. 25, 2005, the entire subject matter of which is incorporated herein by reference.

BACKGROUND

1. Technical Field

Aspects of the invention relate to restricting image formation based on an image formation request transmitted from sources other than a predetermined source on a network.

2. Description of Related Art

Conventionally, a network printer has been know as one of image formation devices connectable to a network. Such a network printer is typically configured such that a printing operation is restricted with respect to a printing request from terminal devices other than a predetermined terminal device, which are connected to the network printer through the network.

Specifically, such a network printer is configured such that an IP address of a predetermined terminal device can be registered. When the printing is restricted against a print request from a terminal device other than the predetermined terminal devices, it is judged whether the IP address of the requesting source device, which is included in the received print request, is registered with the network printer. If the IP address of the requesting source is not registered with the network printer, printing is restricted.

If a plurality of network printers as above are connected to the network, and set each network printer so that the printing is restricted for the request issued by the devices other than a predetermined terminal, the IP address of the predetermined terminal device should be registered with each network printer. Such an operation is very troublesome.

SUMMARY OF THE INVENTION

Aspects of the invention are advantageous in that technique to restrict the image formation based on a request from a source other than a predetermined requesting source can be provided.

BRIEF DESCRIPTION OF THE ACCOMPANYING DRAWINGS

FIG. 4 shows a setting window which is displayed on the display in accordance with a request from the administrator of the server.

DETAILED DESCRIPTION

General Overview

Figure 1:
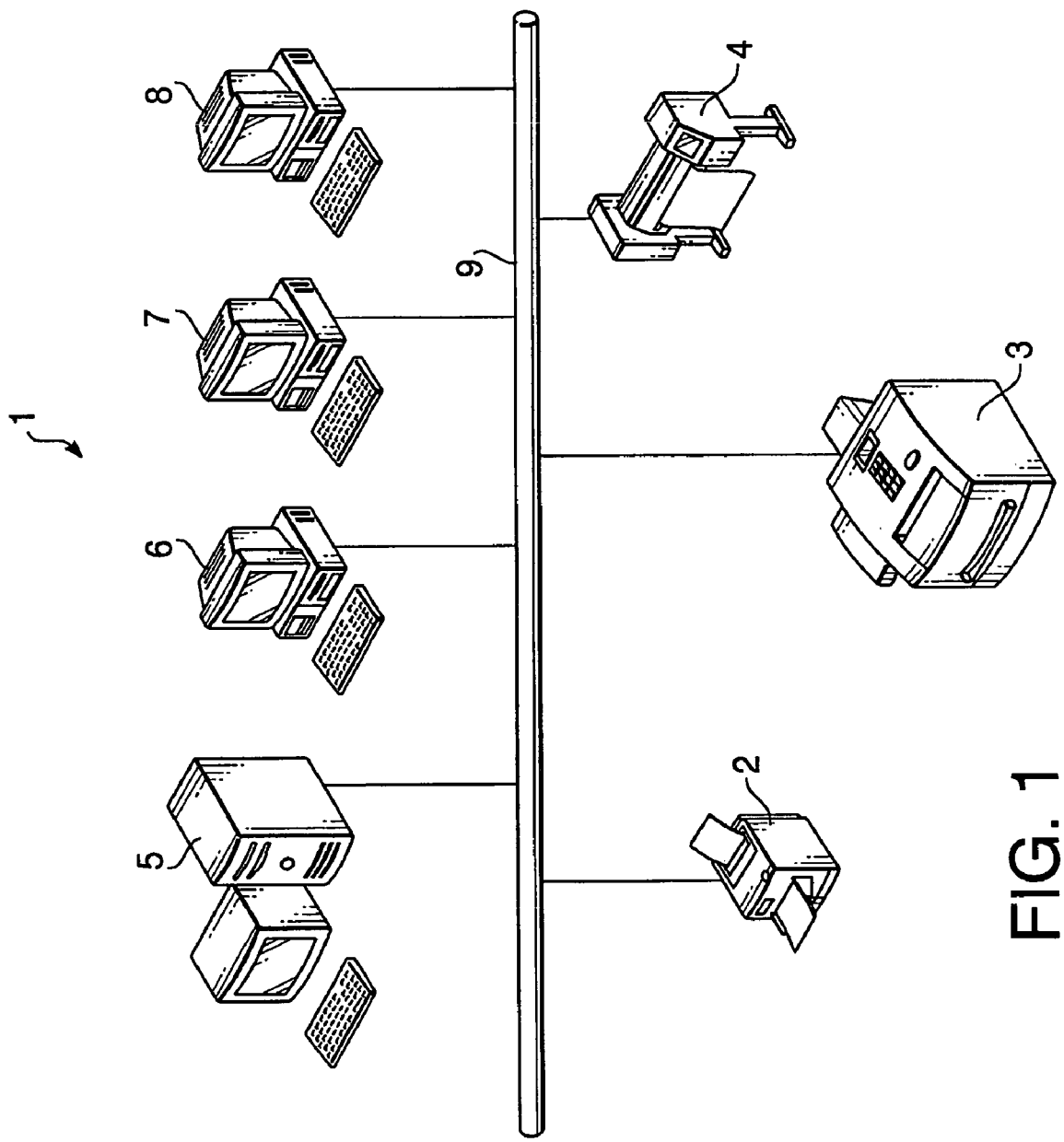
FIG. 1 shows a configuration of a printing system according to aspects of the invention.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

According to aspects of the invention, there is provided an image formation system including an image formation device and a server device, which are connected with each other through a network. The image formation device includes an image formation request receiving unit that receives an image formation request from a terminal device through the network, an image formation executing unit that executes the image formation in accordance with the image formation request received by the image formation request receiving unit, and a request source information transmitting unit that transmits request source information, which is included in the image formation request. The image formation executing unit can restrict the image formation when a restriction instruction is received from the server device. The server device includes a restriction instruction transmitting unit that transmits a restriction instruction when a registration status of the request source information with respect to a database for storing the request source information satisfies a predetermined status.

According to the above configuration, when the image formation executing unit forms an image in accordance with the image formation request received from the terminal device via the network, the request information transmitting system of the image formation device transmits the request information included in the image formation request to the server device.

On the other hand, the restriction instruction transmitting unit of the server device judges whether the predetermined condition is satisfied, and when the predetermined condition is satisfied, the restriction instruction is transmitted to the image formation device.

The image formation executing unit restricts the image formation by the image formation device upon receipt of the restricting instruction.

The predetermined status may include a status where the request source information received from the image formation device is not registered with the database.

According to the above-configuration, the image formation device asks the server whether the request source of the received image formation request is a predetermined request source. Then, the server device received the inquiry judges whether the request source information is registered with the database. Depending on the result of the judgment, the image formation device executes or restricts the image formation.

At least a first restriction status may be registered with the database in relation to the request source information, and the restriction instruction transmitting unit may transmit the restriction instruction when the first restriction status regarding the request source information received from the image formation unit is satisfied.

In this case, for the image formation request from the request source which is not registered with the database, the image formation is restricted, and further, even if the image formation request is received from the predetermined request source, if the first restriction status is satisfied, the image formation can be restricted. That is, a target of restriction of the image formation can be set minutely.

The image formation device may include an image formation feature transmitting unit that transmits an image formation feature included in the image formation request to the server device. At least a second restriction status is registered with the database in relation to the image formation feature corresponding to the request source information, and the restriction instruction transmitting unit may transmit the restriction instruction when the second restriction status regarding the image formation feature received from the image formation unit is satisfied.

In the above configuration, even when the image formation request is received from the predetermined request source, if the predetermined image formation content is included and the second restriction status is satisfied with respect to the image formation content, the image formation can be restricted. That is, based on the image formation content, the target for which the image formation is restricted can be set minutely.

The image formation feature may include the number of formed pages of images, and an upper limit of the number of pages of the images to be formed may be registered with the database as the second restriction status.

If the database is configured as above, based on the upper limit of the number of formed pages of the images, the image formation with respect to the predetermined request source. Further, it is not necessary to register the upper limit of the number of pages in the image formation devices individually. Only by registering the upper limit of the pages with the database in relation with the request source information of the predetermined request source, the number of pages can be restricted in the image formation for the predetermined request source. It should be noted that the upper limit of the number of pages may be the upper limit for one image formation job. Alternatively, the upper limit may represent a value for accumulated number of pages for a series of image formation jobs.

The image formation feature may include the number of print colors of the image formation, and the upper limit of the number of pages may be registered with the database in relation to a predetermined number of print colors.

If the database is set as above, based on the upper limit of the number of pages for the predetermined number of print colors, the image formation for the predetermined request source can be restricted. Further, according to such a configuration, it is not necessary to register the upper limit of the number of pages for individual image formation devices. Only by registering the upper limit for the predetermined number of image formation colors with the database in association with the request source information of the predetermined request source, the number of pages in image formation for the predetermined image formation colors of the predetermined request source can be restricted.

The image formation feature may include a type of a recording medium, and the upper limit of the number of pages may be registered with the database in relation to a predetermined type of the recording medium.

If the database is configured as above, based on the upper limit of the number of pages in image formation for the predetermined recording medium, the image formation for the predetermined image request source can be restricted. Further, it is not necessary to register the upper limit of the number of pages for the predetermined recording medium with individual image formation devices. Only by registering the upper limit of the number of pages for the predetermined recording medium with the database in association with request information of the predetermined request source, the number of the pages for the predetermined recording medium for the predetermined request source can be restricted.

The image formation device may include a first image formation result information transmitting unit that transmits first image formation result information to the server device, the first image formation result information including the request source information, the image formation feature and the number of formed pages of images. The server device may include a first upper limit updating unit that updates the upper limit of the number of pages based on the request source information, the image formation feature and the number of formed pages of images.

If the image formation system is configured as above, if the upper limit includes the accumulated number of pages for a series of image formation, when the image formation is finished, the upper limit can be automatically bases on the request source information, image formation content and the number of pages of the formed images, without requiring the administrator's operation.

The image formation device may include a first image formation result information transmitting unit that transmits first image formation result information to the server device, the first image formation result information including the request source information, the image formation feature and the number of formed pages of images. An accumulated number of formed pages of the images may be registered with the database in relation to the request source information. The server device includes a first accumulated number updating unit that updates the accumulated number of pages based on the request source information, the image formation feature and the number of formed pages of images included in the first image formation result information. The restriction instruction transmitting unit may determine that the second predetermined status is satisfied when the sum of the accumulated number of pages and the number of formed pages included in the first image formation result exceeds the upper limit.

In this configuration, it becomes possible to judge whether the accumulated number of pages of the images and the second restriction status is satisfied without requiring the upper limit registered with the database to be updated.

The image formation device may include a device information transmitting unit that transmits device information identifying the image formation device to the server device. A third restriction status regarding a predetermined image formation characteristic may be registered with the database in relation to image request source information.

The restriction instruction transmitting unit that transmits the restriction instruction when the third restriction status with respect to the request source information received from the image formation device is satisfied in regard with the predetermined image formation characteristic of the image formation device preliminarily set corresponding to the device information received from the image formation device, the restriction instruction being transmitted to the image formation device when the third restriction status is satisfied.

In the above configuration, even through the image formation is requested by the predetermined request source, if the third restriction status is satisfied with respect to the image formation characteristics of the image formation device which would form the image, the image formation thereby is restricted. That is, based on the image formation characteristic of the image formation device, the target of which the image formation is restricted can be set minutely.

The third restriction status may include the upper limit of the number of pages of images.

If the image formation system is configured as above, it is possible to restrict the image formation for the predetermined request source based on the upper limit of the number of pages corresponding to the predetermined image formation characteristic. Further, it is unnecessary to register the upper limit of the number of pages of the images corresponding to the predetermined image formation characteristic with each image formation device independently. That is, only by registering the upper limit of number of pages of images corresponding to the predetermined image formation characteristic with the database in relation to the request source information of the predetermined request source, the number of pages of the images corresponding to the predetermined image formation characteristic can be restricted. It should be noted that the upper limit of the pages of images maybe that for a single image formation job or that for accumulated number of pages for a series of image formation jobs.

The image formation device may include a second image formation result information transmitting unit that transmits second image formation result information to the server device, the second image formation result information including the request source information, the device information and the number of pages of images. The server device may include a second upper limit updating unit that updates the upper limit based on the request source information, the device information and the number of pages of image included in the second image formation result information.

If the image formation system is configured as above, if the upper limit includes the accumulated number of pages for a series of image formation, when the image formation is finished, the upper limit can be automatically bases on the request source information, the device information and the number of pages of the formed images, without requiring the administrator's operation.

The image formation device may include a second image formation result information transmitting unit that transmits second image formation result information to the server device, the second image formation result information including the request source information, the device information and the number of pages of images.

An accumulated number of pages of the images may be registered with the database in relation to the request source information.

The server device may include a second accumulated number updating unit that updates the accumulated number of pages based on the request source information, the device information and the number of formed pages of images included in the second image formation result information.

The restriction instruction transmitting unit may determine that the third predetermined status is satisfied when the sum of the accumulated number of pages and the number of formed pages included in the second image formation result exceeds the upper limit.

According to the above configuration, it is possible to Judge whether the accumulated number of pages of images has reached the upper limit and the third restriction status is satisfied without updating the upper limit registered with the database.

The image formation device may include a characteristic information transmitting unit configured to transmit characteristic information representing image formation characteristic of the image formation device and the device information to the server device. The server device may include image formation characteristic setting unit configured to set the image formation characteristic represented by the characteristic information in correspondence with the device information represented by the characteristic information when the characteristic information is received from the image formation device.

With this configuration, when an image formation device is newly connected to the network, the server device can immediately obtain the device information and image formation characteristics of the newly connected image formation device. Further, when the image formation device is newly connected to the network, an operator is not required to se the image formation characteristics of the image formation device together with the device information to the server device. That is, amount of work for newly connecting the image formation device can be reduced.

The image formation device is capable of judging whether the server device is connected to the network when the image formation device is connected to the network, and the characteristic information transmitting unit transmits the characteristic information when the server device is judged to be connected to the network.

According to the above configuration, an unnecessary operation of transmitting the characteristic information from the image formation device to the server device when the server is not connected can be prevented. Further, the operator need not check a connection status of the server device.

The server device may include a storage unit that stores the database.

If the server device is configured as above, management of the database can be done only by the server device.

The restriction instruction may inhibit image formation, and the image formation executing unit does not execute the image formation.

If the server device is configured as above, unnecessary image formation can be prevented, and further, unnecessary consumption of recording medium.

The request source information may includes one of a network address assigned to the terminal device and address range including an network address assigned to the terminal device.

In the above configuration, based on the network address or network address range, the request source can be identified. Such a configuration is especially effective for the network of which the address of the terminal device is always fixed.

The request source information may include a name assigned to the terminal device.

In the above configuration, since the request source can be identified based on the name assigned to the terminal device, such a system is very convenient when the network is configured such that the network address of the terminal device may change.

The request source information may include a name assigned to a user of the terminal device.

According to the above configuration, since the request source can be identified based on the name assigned to the user, the system is very convenient when the same terminal device is used by a plurality of users and/or the same user uses a plurality of terminal devices.

The predetermined status may include a status where the restriction status regarding the request source information received from the image formation unit is registered with the database and the restriction status is satisfied when the request source information received from the image formation device is registered with the database.

According to aspects of the invention, there is provided an image formation device which can be employed in the image formation system described above.

According to aspects of the invention, there is provided a server device which can be employed in the image formation system described above.

According to aspects of the invention, there is provided a computer program product having computer readable instructions that cause a computer to server as an image formation device described above.

According to aspects of the invention, there is provided computer program product having computer readable instructions that cause a computer to server as a server device described above.

EMBODIMENTS

Referring to the accompanying drawings, an illustrative embodiment of the present invention will be described in detail.

FIG. 1 shows a configuration of a printing system 1 according to aspects of the invention.

As shown in FIG. 1, the printing system 1 includes printers 2, 3 and 4, a server device 5, and personal computers (PCs) 6, 7 and 8, which are interconnected through a network 9. In the printing system 1, the above devices are capable of communicating with each other in accordance with a predetermined communication protocol (which is TCP/IP according to the embodiment). According to the illustrative embodiment, the printers 2, 3 and 4 are a monochromatic laser printer, a color laser printer and a color inkjet printer, respectively.

The server device 5 is configured to function as a database server (e.g., a directory server, specifically, an LDAP (Lightweight Directory Access Protocol) server). In the PCs 6, 7 and 8, application programs for creating/editing texts and drawings and the like are installed. Also installed are printer drivers for driving printers 2, 3 and 4. By executing the application programs, texts and drawings can be created, and printing jobs including the thus created text/drawings, the number of pages to be printed, the number of colors for printing, the type of a recording sheets are accommodated in a packet, which print jobs are transmitted to the printers 2, 3 and 4 as print requests, respectively.

Figure 2:
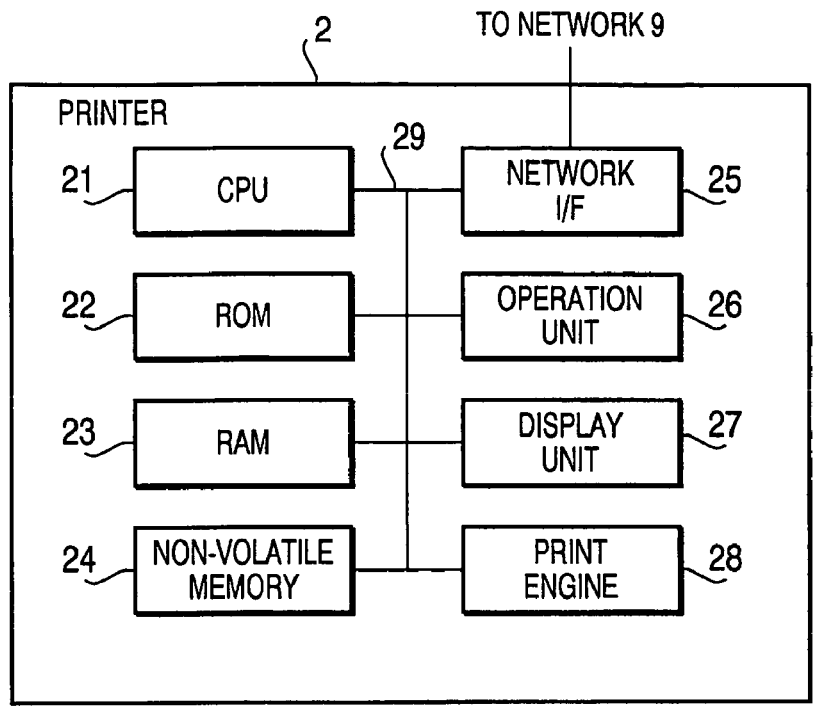
FIG. 2 is a block diagram of the printer employed in the printing system shown in FIG. 1.

FIG. 2 is a block diagram of the printer 2. It should be noted that the printers 2, 3 and 4 are different in their printing characteristics of print engines (i.e., monochromatic laser, color laser and color inkjet), and other functional components are substantially similar to each other. Therefore, in the following description, only the printer 2 will be described as a representative, and description of the other printers 3 and 4 will be omitted.

As shown in FIG. 2, the printer includes 2 is provided with a CPU (Central Processing Unit) 21 that controls an entire operation of the printer 2, a ROM (Read Only Memory) 22 that stores various programs to be executed by the CPU 21, device information including a device name of the printer 2, printing characteristics and the number of colors for printing, a RAM (Random Access Memory) 23 used as work area (temporary storage area) when the CPU 21 executes various procedures, a non-volatile memory 24 that stores data created during various procedures and error information, and a network interface (I/F) 25 through which the CPU 21 is connected to the network 9.

The printer 2 further includes an operation unit 26 provided with externally operable operation switches. Input signals from the operation switches of the operation unit 26 are transmitted to the CPU 21. The printer 2 further includes a display unit 27 that displays an operation status of the printer 2, and the print engine 28 for printing images on the recording sheet. In the printer 2, the above-described functional components are interconnected via a signal bus 29.

Figure 3:
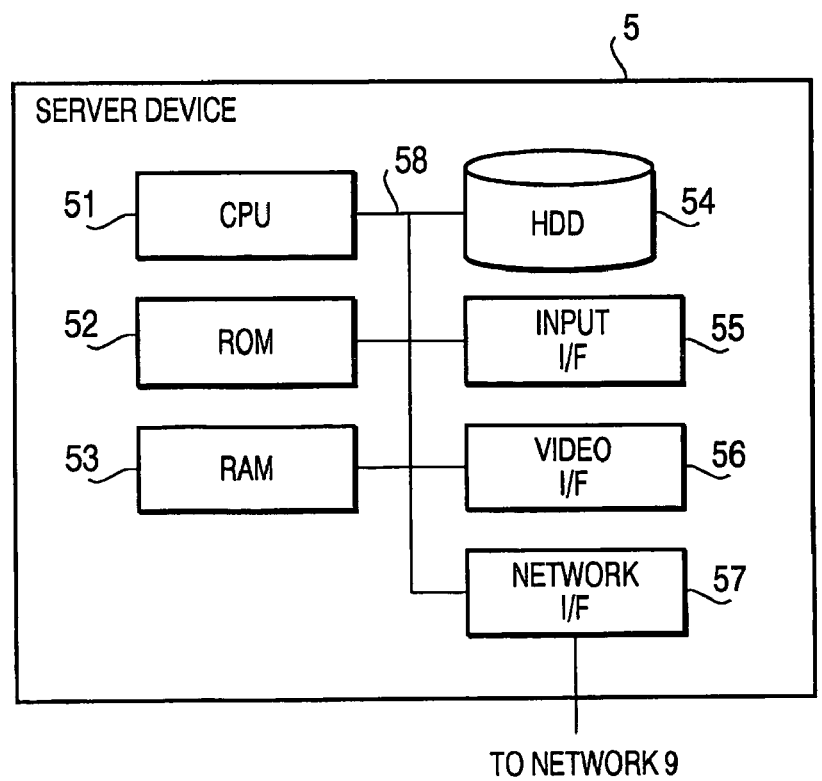
FIG. 3 is a block diagram of a server device employed in the printing system shown in FIG. 1.

FIG. 3 is a block diagram of the server device 5. As shown in FIG. 3, the server device 5 is provided with a CPU 51 that executes various procedures, a ROM 52 storing a boot program (BIOS) to be executed by the CPU 51 when the server device 5 is started up and other programs, a RAM 53 used as a storage area when the CPU 51 executes various procedures, a hard disk drive (HDD) 54 storing an operating system, a server program for controlling the server device 5 to function as the database server, a database (described later) and device information of the printer 2. The server device 5 is further provided with an input interface (I/F) 55 for inputting input signals from a keyboard (not shown) and mouse (not shown) connected to the server device 5 to the CPU 51, a video I/F 56 that operates to display images/characters on a display (not shown) in accordance with the instruction from the CPU 51, and a network I/F 57 that interconnects the CPU 51 and the network 9. In the server device 5, the above-described components are interconnected through the signal bus 58.

FIG. 4 shows a setting window, which is displayed on the display unit by the CPU 51 of the server 5 in response to a request by an administrator of the server device 5. As shown in FIG. 4, in response to the administrator, the CPU 51 displays the setting window 50 that employs GUI (Graphical User Interface) and allows the user to set contents of a database 541 stored in the HDD 54.

Specifically, with the database 541, IP addresses and/or IP address range of PCs for which the printing is allowed are registered, and in relation to the IP addresses (and/or IP address range), the upper limit of the number of printable pages (restricted number of pages), the number of consumed pages indicative of the accumulated number of pages, and restriction conditions with which the number of printed pages is restricted, are registered. It should be noted that, according to the illustrative embodiment, as a first restriction condition, a predetermined printing characteristic is set, as a second restriction condition, a predetermined number of colors is set, and as a third restriction condition, the restricted number for a predetermined type of recording sheet is set.

That is, with the database 541, the IP addresses and/or IP address range of the PCs for which the printing is permitted are set, and further, in relation with the same, the predetermined printing characteristic, the predetermined number of colors, the restricted number of pages for the predetermined type of recoding sheet are set.

On the setting window 50, an addition button 501 used for adding the IP addresses, IP address range, the restricted number of pages, the restriction condition to the database 541, and a deletion button 502 used for deleting the IP addresses, IP address range, the restricted number of pages, the restriction condition from the database 541.

Next, among various procedures executed by the printers 2, 3 and 4, and the server device 5, ones related the invention will be described. It should be noted that the procedures executed by the printer 2 are similar to those executed by the printers 3 and 4. Therefore, in the following description, the procedures executed by the printers 2, 3 and 4 are described as one executed by the printer 2.

Figure 5:
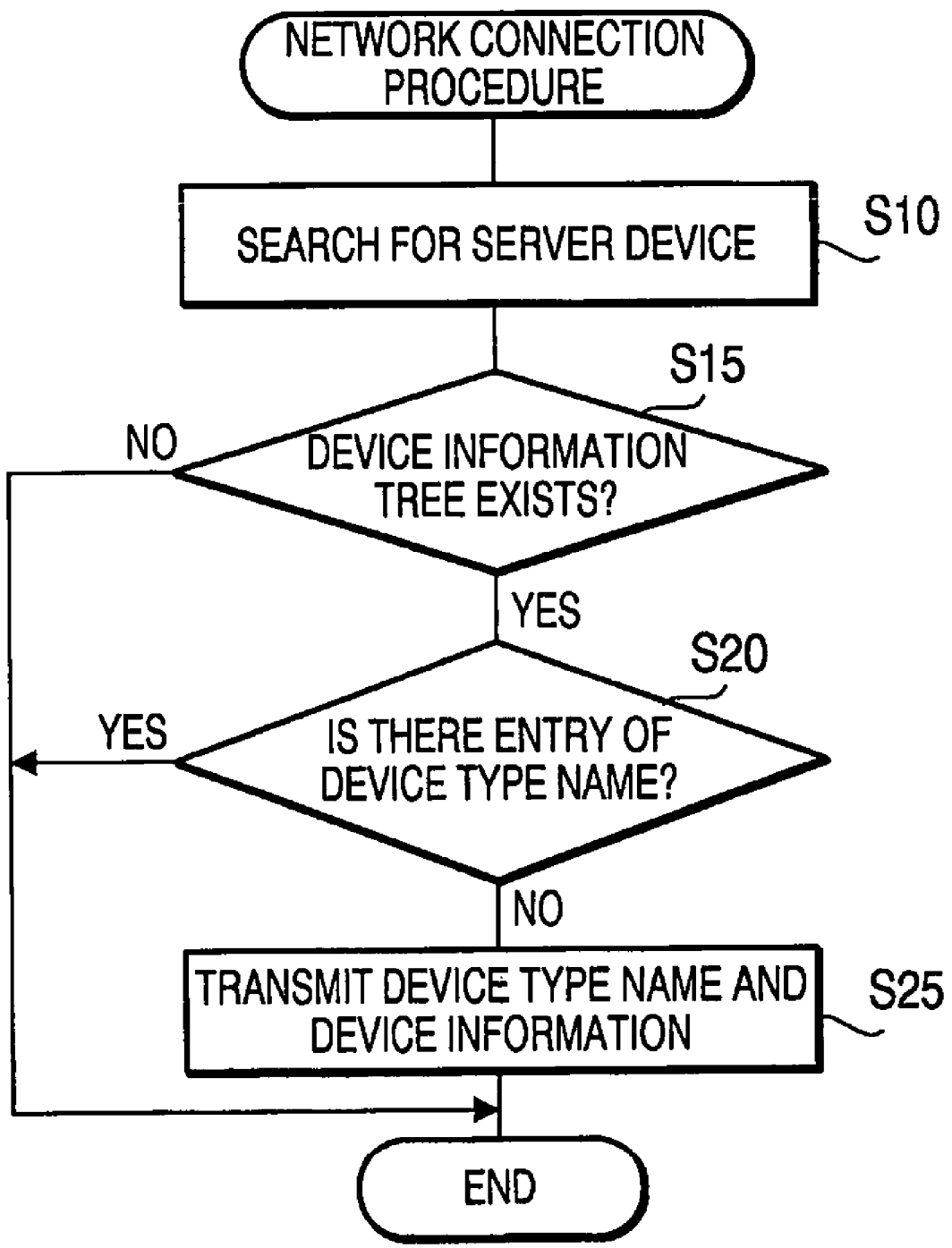
FIG. 5 shows a flowchart illustrating a network connecting procedure executed by the CPU of the printer.

FIG. 5 shows a flowchart illustrating a network connection procedure executed by the CPU 21 of the printer 2. The CPU 21 executes the network connection procedure when the printer 2 is connected to the network 9. It should be noted that, in the specification, a case where the printer 2 is powered on, a case where a network cable is connected to the printer 2, or a case where the printer 2 (i.e., CPU 21) performs a communication starting procedure with respect to a wireless access point, it is determined that the printer 2 is connected to the network 9.

As shown in FIG. 5, in the network connection procedure, the process searches for a server device corresponding to a directory service protocol having a directory service function connected to the network 9 using a preliminary set well-known SLP (Service Location Protocol) user agent program (S10). Then, from the server device (in the illustrative embodiment, only from the server device 5) connected to the network 9, the process receives the IP address of the server device and/or contents of the directory set to the server device. It should be noted that, if the IP addresses have already been given or the CPU 21 is set such that a predetermined server device is used, the searching process is unnecessary.

Next, the process judges whether there is a device information tree with which the device information of the printer is to be registered is included in the contents of the directory received from the server device. If there is no device information tree (S15: NO), the process finishes the network connection procedure.

If there is a device information tree (S15: YES), the process further judges whether there is an entry of the device type of the printer 2 in the device information tree (S20). If there is an entry of the device type of the printer 2 (S20: YES), the process immediately finishes the network connection procedure.

If there is not the entry of the device type of the printer 2 (S20: NO), the process transmits a registration request together with a device type and device information to the server device (S25), and finishes the network connection procedure.

Figure 6:
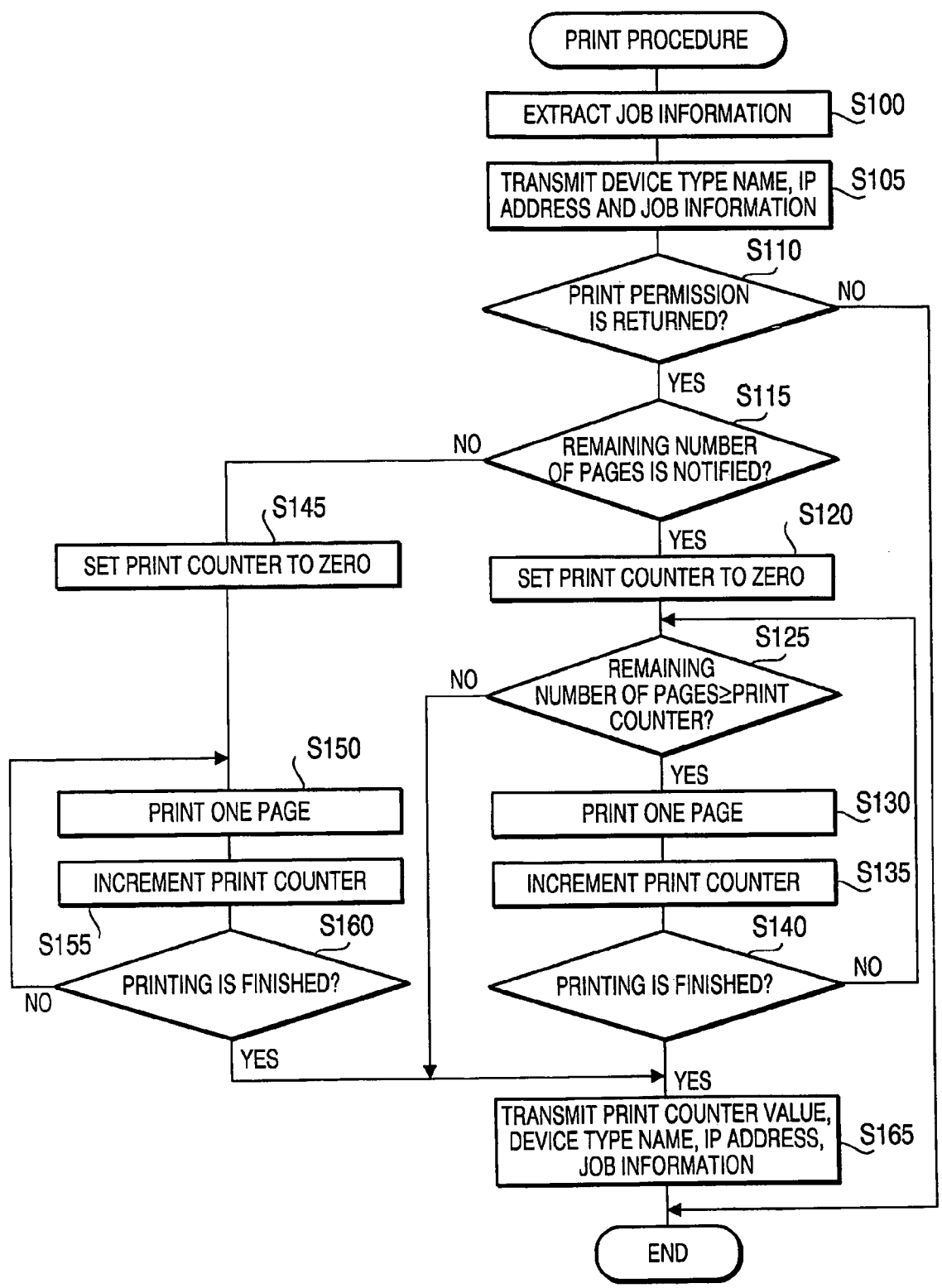
FIG. 6 shows a flowchart illustrating a printing procedure executed by the CPU of the printer.

FIG. 6 shows a flowchart illustrating a printing procedure executed by the CPU 21 of the printer 2. The CPU 21 executes the printing procedure when it received a print job from PC 6, 7 or 8.

As shown in FIG. 6, in the printing procedure, the process firstly extracts job information including the number of paged to be printed, the number of colors, the type of the recording sheet and the like from the received print job (S100). Then, the process transmits a judgment request requiring the server device 5 to determine whether the printing is allowed, together with the device type of the printer 2, the IP address of the source of the print job, and job information to the server device 5 (S105).

Next, the process judges whether print permission is received from the server device 5 (S110). If print inhibition is received from the server device 5 (S 110: NO), the process immediately finishes the printing procedure. If the process receives the print permission (S110: YES), the process judges whether a notification of the remaining number of pages to be printed from the server device 5 (S 115).

If the process receives the notification of the remaining number of pages (S115: YES), the process sets the value of a print counter which is used for counting the number of printed pages to zero (S120), and judges whether the value of the print counter is equal to or less than the received remaining number of pages (S125). If the value of the counter is greater than the remaining number of pages (S125: NO), the process proceeds to S165.

If the value of the print counter is equal to or less than the remaining number of pages (S125: YES), the process executes the printing operation to print one page (S130), and increments the print counter by one (S135). Then, based on the contents of the received print job, the process judges whether the printing has been finished (S140). If the printing has been finished (S140: NO), the process returns to S125, while if the printing has been finished (S140: YES), the process proceeds to S165.

If the process has not received the notification of the remaining number of pages (S115: NO), the process sets the value of the print counter to zero (S145), executes the printing operation to print one page (S150), increments the print counter by one (S155), and then judges whether the printing has been finished, in S160, based on the contents of the received print job.

If the printing has not been finished (S160: NO), the process returns to S150. If the printing has been finished (S160: YES), the process transmits the update request that request the server device 5 to update the number of the consumed pages together with the value of the print counter, the device type, the IP address of the source of the print job, the job information and the like to the server device 5 (S165), and finishes the printing procedure.

Figure 7:
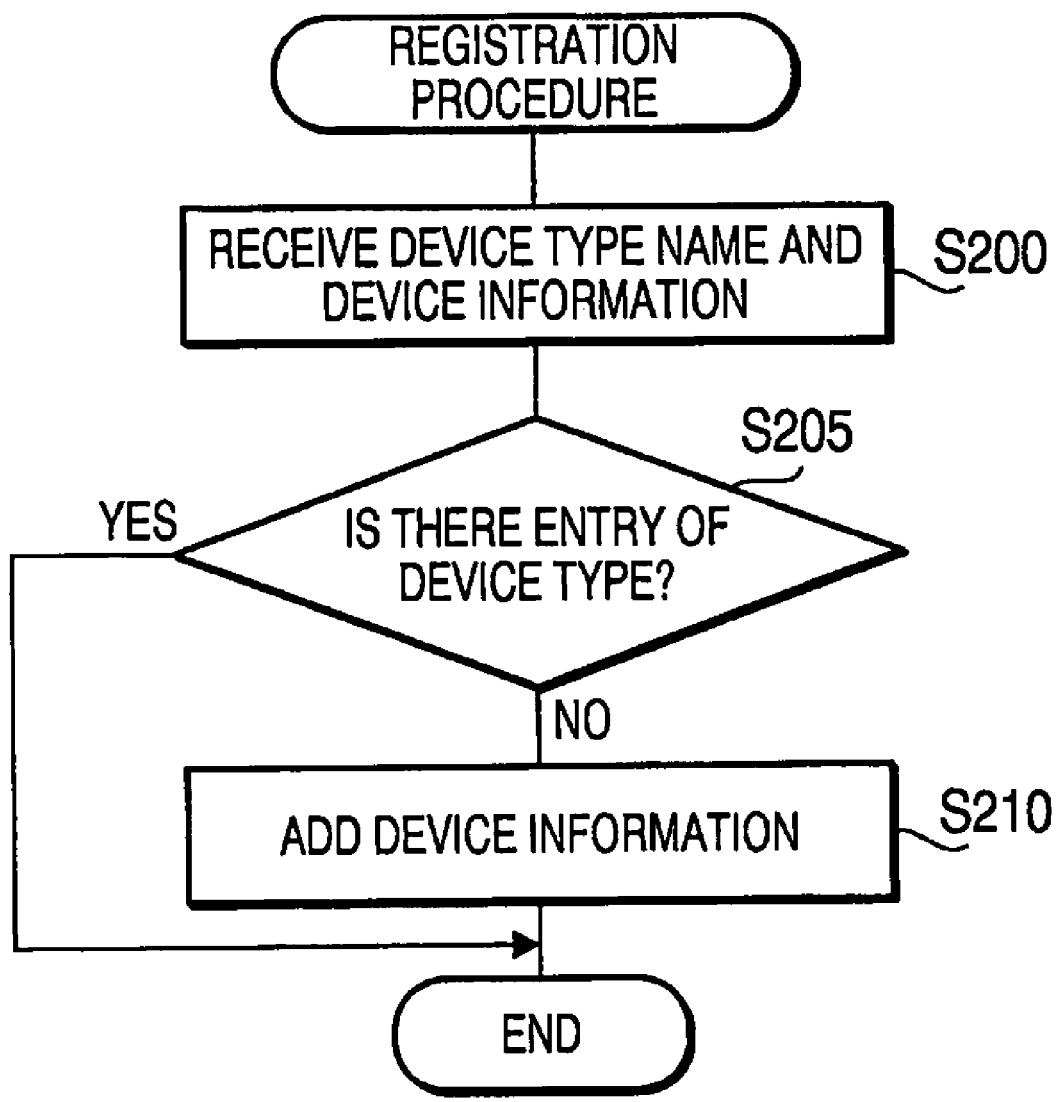
FIG. 7 shows a flowchart illustrating a registration procedure executed by the CPU of the server device.

FIG. 7 shows a flowchart illustrating a registration procedure executed by the CPU 51 of the server device 5. It should be noted that the CPU 51 executes the registration procedure when the above-described registration request is received.

As shown in FIG. 7, the process firstly receives the device type and device information transmitted together with the registration request (S200), and judges whether the entry of the received device type name is included in the device information tree stored on the HDD 54 (S205).

If the received device type name is included in the device information tree (S205: YES), the process immediately finishes the registration procedure. If the received device type name is not included in the device information tree (S205: NO), the process adds the received device information to the device information tree (S210) using the received device type name as the entry, and finishes the registration procedure.

Figure 8:
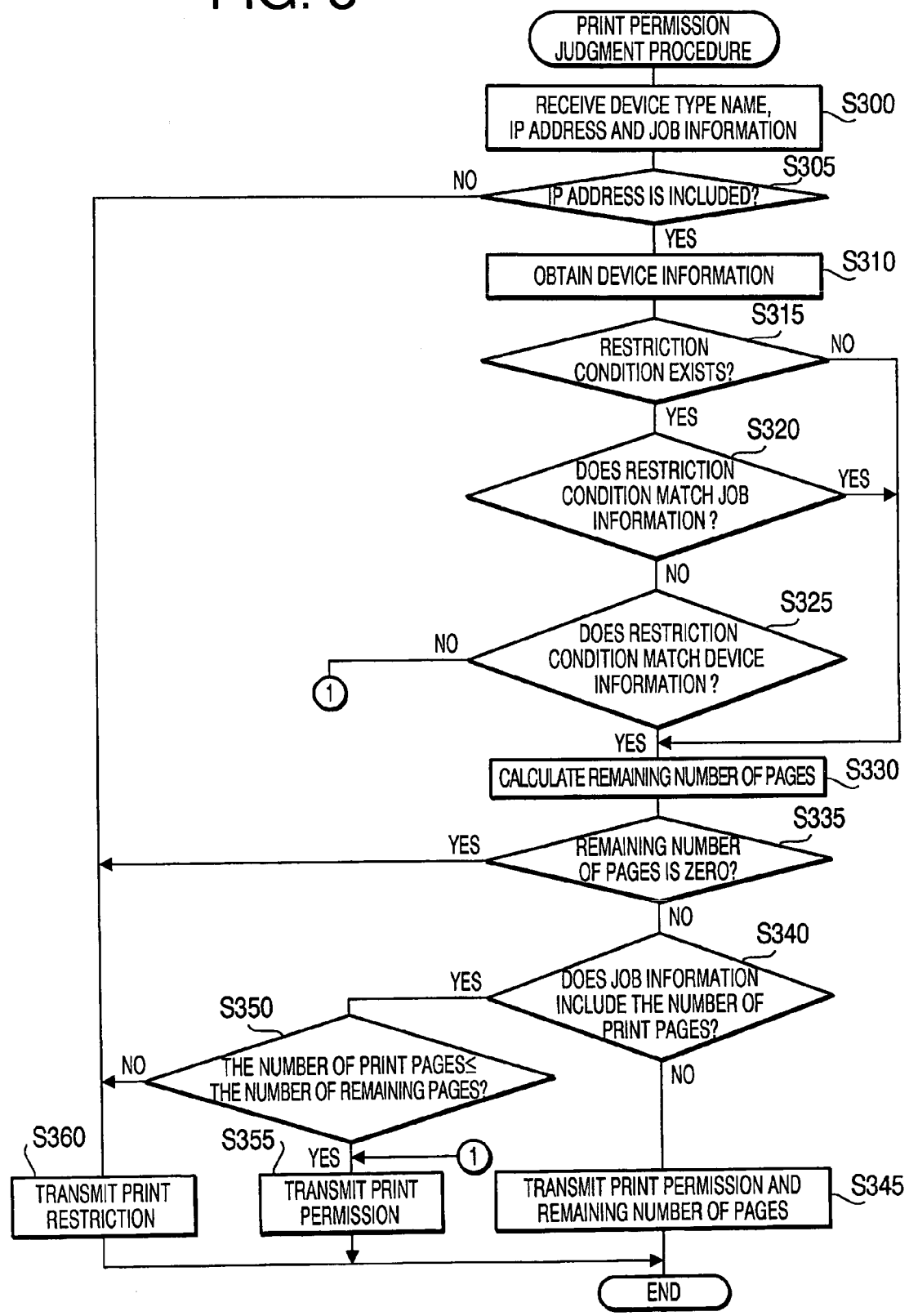
FIG. 8 shows a flowchart illustrating the print determining procedure executed by the CPU of the server device.

FIG. 8 shows a flowchart illustrating a print permission judgment procedure executed by the CPU 51 of the server 5. The CPU 51 executes the print permission judgment procedure when it receives the judgment request.

As shown in FIG. 8, the process receives the device type name, the IP address of the source of the print job, the job information together with the judgment request (S300), and judges whether the IP address of the source of the print job is registered with the database 541 (S305).

If the IP address of the source of the print job is not registered with the database 541 (S305: NO), the process proceeds to S360. If the IP address of the source of the print job is registered with the database 541 (S305: YES), the process obtains the device information (i.e., the printing characteristics, the number of print colors) based on the entry of the received device type name (S310). Then, the process judges whether a restriction condition (i.e., particular printing characteristics, the number of print colors, the type of recording sheet) with respect to the IP address of the source of the print job is registered with the data base 541 (S315). If the restriction condition is not registered (S315: NO), the process proceeds to S330.

If the restriction condition is registered (S315: YES), the process judges whether the restriction condition meets an item of the job information (i.e., the number of pages, the number of print colors and the type of the recording sheet) in S320. If the restriction condition meets the item of the job information (S320: YES), the process proceeds to S330.

If the restriction condition does not meet any one of the items included in the job information (S320: NO), the process judges whether the restriction condition meets an item of the device information (S325). If the restriction condition dose not meet any one of the items of the deice information (S325: NO), the process proceeds to S355.

If the restriction condition meets an item of the device information (S325: YES), the process subtracts the consumed number of pages from the restricted number of pages to obtain the remaining number of pages (S330), and judges whether the consumed number of pages reaches the restricted number of pages (S335).

If the remaining number of pages is zero (S335: YES), the process proceeds to S360. If the remaining number of pages is not zero (S335:NO), the process judges whether the job information includes the item of the number of pages to be printed (S340). If the number of pages to be printed is not included (S340: NO), the process transmits the print permission and notification of the remaining number of pages to the server device 5 (S345), and finishes the print permission judgment procedure.

If the job information includes the number of pages to be printed (S340: YES), the job judges whether the number of pages to be printed is equal to or less than the remaining number of pages (S350). If the number of pages to be printed is less than the number of remaining pages (S350: YES), the process transmits the print permission to the server device (S355), and finishes the print permission judgment procedure.

If the number of pages to be printed is greater than the number of remaining pages (S350: NO), the process transmits the print inhibition to the server device 5 (S360) and finishes the print permission judgment procedure.

Figure 9:
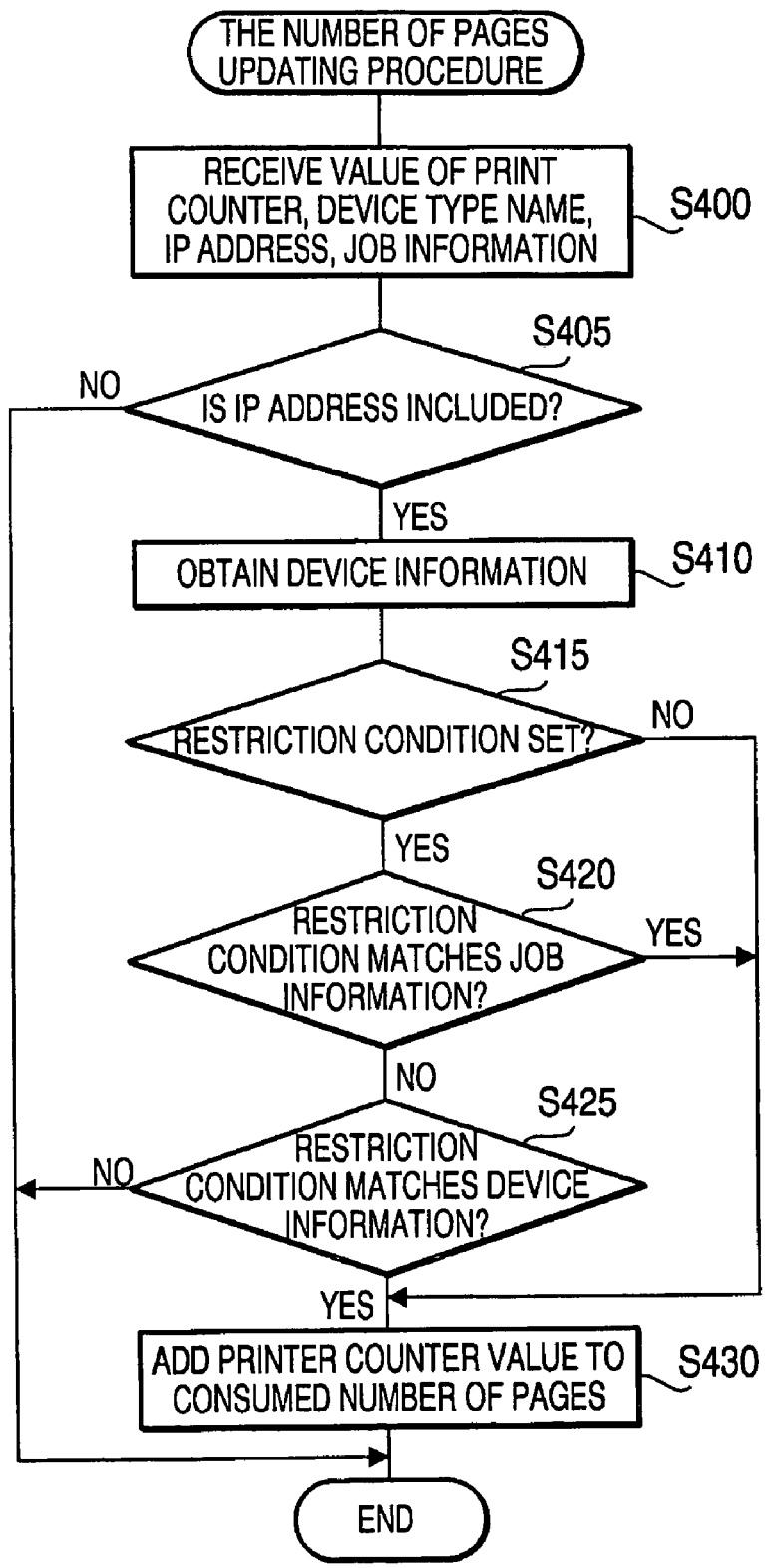
FIG. 9 shows a flowchart illustrating a page updating procedure executed by the CPU of the server device.

FIG. 9 shows a flowchart illustrating the number updating procedure executed by the CPU 51 of the server device 5. The CPU 51 executes the number updating procedure when it receives the updating request.

As shown in FIG. 9, the process first receives the value of the print counter, the device type name, the IP address of the source of the print job and job information together with the updating request (S400). Then, the process judges whether the IP address of the source of the print job is registered with the database 541(S405). If the IP address of the source of the print job is not registered with the database 541(S405: NO), the process immediately finishes the number updating procedure.

If the IP address of the source of the print job is registered with the database 541 (S405: YES), the process obtains the device information from the entry of the received device type name (S410). Then, the process judges whether the restriction condition corresponding to the IP address of the source of the print job is registered with the database 541(S415). If the restriction condition is not registered (S415: NO), the process proceeds to S430.

If the restriction condition is registered (S415: YES), the process judges whether the restriction condition meets one of the items of the job information (S420). If the restriction condition meets the one of the items of the job information (S420: YES), the process proceeds to S430.

If the restriction condition does not meet any one of the items of the job information (S420: NO), the process judges whether the restriction condition meets an item of the device information (S425). If the restriction condition does not meet nay item of the job information (S425: NO), the process finishes the number updating procedure.

If the restriction condition meets an item of the device information (S425: YES), the process adds the received value of the print counter to the consumed number of pages (S430) to update the consumed number of pages registered with the database 541, and then finishes the number updating procedure.

Figure 10:
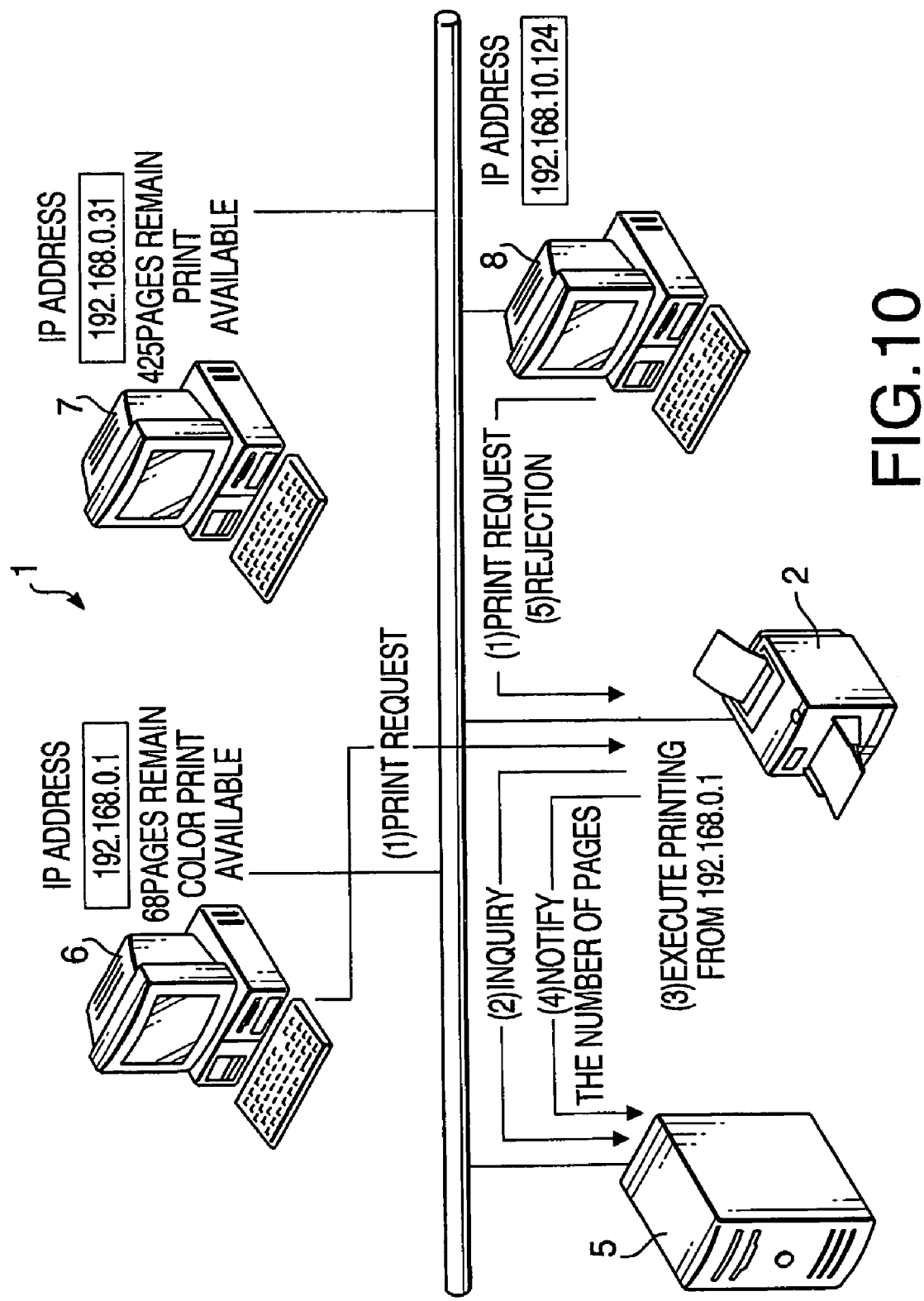
FIG. 10 shows a chart illustrating an operation of the printer, server device and PC3.

According to the printing system 1, as shown in FIG. 10, when the printer 2 (3 or 4) receives a print request from one of the PCs 6, 7 and 8 (#1), the process inquire the server device 5 whether the source of the print request is the PC for which the printing is allowed (#2). Then, the server 5 judges whether the IP address of the PC which is the source of the print request is registered with the database 541, and if registered, the server device 5 transmits the print permission to the printer 2. Then, the printer 2 that receives the print permission executes the printing operation in accordance with the print request (#3). Then, at the end of printing, the process notifies the number of printed pages to the server device 5 (#4). The server device 5 updates the consumed number of pages registered with the database 541 based on the received number of printed pages.

If the IP address of the PC that is the source of the print request is not registered with the database 541, the server device 5 transmits the print inhibition to the printer 2. The printer 2 that receives the print inhibition rejects the printing operation (#5).

Even if the IP address of the PC that is the source of the print request is registered with the database 541, if predetermined print characteristics, a predetermined number of print colors, a predetermined type of recording sheet are registered with the database as the restriction condition, and the number of the consumed pages has reached the restricted number of pages, or if the restriction condition is not registered with the database 541 but the number of consumed pages has reached the restricted number of pages, the server device 5 transmits the print inhibition to the printer 2, thereby the printer 2 rejects the printing operation. FIG. 10 shows an example of operations executed by the printer 2, server device 5 and PCs 6, 7 and 8 of the print system 1.

As above, according to the print system 1, when the printers 2, 3 and 4 are connected to the network 9, it is unnecessary to register the IP addresses of the PC for which printing is allowed in each printer. That is, only by registering the IP address of the PC for which the printing is allowed, the printers 2, 3 and 4 can function to reject the print request from the PCs other than that for which the printing is allowed.

According to the print system 1, even though the IP address of the source of the print request is registered with the database 541, if the consumed number of pages reaches the restricted number (i.e., a condition of restricted number of pages is satisfied), the server device 5 instructs the printers 2, 3 and 4 to inhibit the printing operation. Therefore, based on the restricted number of pages, inhibition of the printing can be controlled flexibly. Further, according to the illustrative embodiment, it is unnecessary to register the restricted number of pages with each printer. That is, only by registering the restricted number of pages with the database 541 in relation with the IP address of the PC that is allowed to execute printing, the number of printed pages for the other PCs can be controlled.

According to the print system 1, using the database 541, the restricted number of pages is related to the predetermined print characteristics, predetermined print colors and predetermined type of recording sheet. Therefore, based on the restricted number of pages for the predetermined print characteristics, predetermined print colors and predetermined type of recoding sheet, the printing operation for the PC for which the printing is allowed can be controlled. Further, it is unnecessary to register the predetermined printing characteristics, predetermined print colors and predetermined type of recording sheet with each printer. Only by registering restriction number of the predetermined printing characteristics, predetermined print colors and predetermined type of recording sheet with the database 541 in relation with the IP address of the PC which is allowed to execute printing, the number of pages to be printed for the predetermined printing characteristics, predetermined print colors and predetermined type of recording sheet can be restricted.

According to the print system 1, when the printing is finished, the printers 2, 3 and 4 transmit the number of printed pages (i.e., the value of the print count), the device type name, the IP address of the PC which is the source of the print job and the job information to the server device 5. Then, the server device 5 updates the consumed number of pages registered with the database 541. Therefore, it is ensured that the server device 5 can update the database 541 without requiring the user's manual operation for the update. Thus, the server device 5 can determine whether the number of printed pages reaches the restricted number without updating the restricted number of pages.

Figure 11:
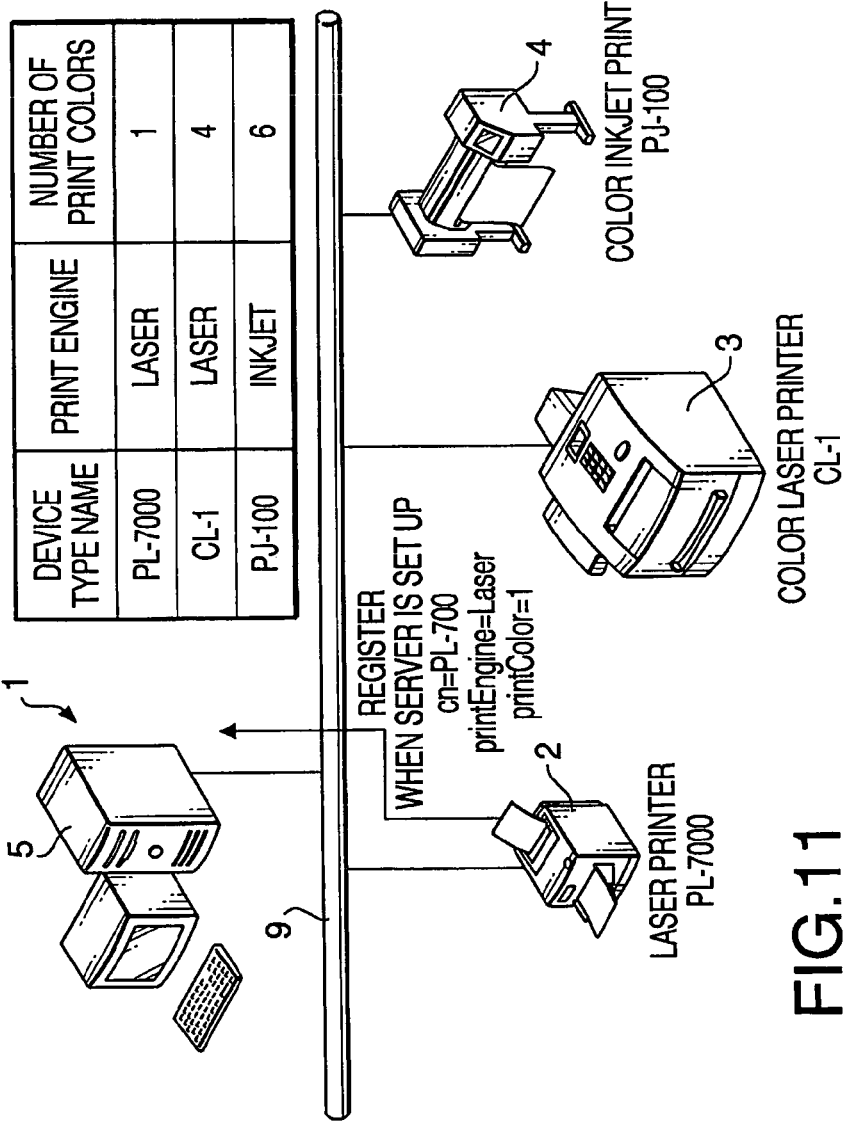
FIG. 11 shows a chart illustrating an operation of the printer and the server device when the printer is connected to the network.

According to the print system 1, as shown in FIG. 11, the printer 2 (also printers 3 and 4) searches for the server device 5 when connected to the network 9. Only when the device information tree is set in the server device 5, the printer 2 transmits the device type name and device information to the server device 5. Therefore, it is possible to prevent the printer 2 (and printers 3 and 4) from transmitting the device type name and the device information when the server device 5 is not connected to the network 9.

Since the printer 2 automatically searches for the server, it is unnecessary for an operator to check the connection status of the server device 5. Further, according to the illustrative embodiment, when the printer 2 is connected to the network 9, the device type name and the device information can be provided immediately to the server device 5. Further, with this configuration, the operator who connects the printer 2 to the network 9 is not required to manually set the device type name and device information to the server device 5. Therefore, the amount of work of the operator can be reduced. FIG. 11 shows operations of the printer 2 and the server device 5 when the printer 2 is connected to the network 9.

According to the print system 1, the database 541 is provided to the HDD 54 of the server device 5. Therefore, the database 541 can be managed only by the server device 5.

According to the print system 1, the printers 2, 3 and 4 are configured such that, when the print inhibition is received from the server device 5, the printers 2, 3 and 4 do not execute printing operation. Therefore, it is possible to prevent unnecessary printing operations, which can also prevent unnecessary consumption of consumable items such as toner and ink.

According to the above-described embodiment, since the IP addresses or IP address range is registered. Such a configuration is particularly effective for a network in which the PC addressees are permanently fixed.

It should be noted that the invention needs not limited to the configuration of the above-described illustrative embodiment, but can be modified in various ways according to aspects of the invention.

For example, in the above-described illustrative embodiment, the restricted number of pages for the predetermined print characteristics, the predetermined number of print colors, the predetermined type of recording sheet is registered in relation with the IP address of the PC for which the printing is allowed. This configuration may be modified such that a restriction item other than the number of pages may be included. Specifically, for example, designation of monochromatic printing, toner save mode printing, N-in-1 printing (N being an integer more that one), designation of less expensive recording medium, designation of reduced printing, and the like. It should be noted that any restriction that restricts the printing operation may be employed. It may be preferable if the restriction restricts consumption of resources.

In the above-described illustrative embodiment, the IP addresses or IP address range of PCs for which the printing is allowed are registered with the database 541. This configuration may be modified such that the names assigned to the PCs or users of the PCs may be registered with the database 541.

It should be noted that, if the names assigned to the PCs are registered with the database, it is possible to identify the source of the print job based on the name assigned to a PC. Therefore, such a configuration is particularly convenient for a network in which the addresses of the PCs vary. In such a case, however, it is necessary to prepare a name-conversion server that sets the PC so that the name assigned to the PC is included in the print request, or the name of the PC is obtained from the IP address of the print request.

If the name assigned to the user of each PC is registered with the database, it is possible to identify the source of the print job based on the name assigned to the user. Such a configuration is particularly convenient if the same PC is used by a plurality of users, or if a single user uses a plurality of PCs. It should be noted that, in such a case, each PC is configured such that the name assigned to the user is included in the print request.

In the above-described illustrative embodiment, the printers 2, 3 and 4, the server device 5, and the PCs 6, 7 and 8 are all connected to the same network 9. The aspects of the invention are also applicable when the server device 5 is connected to a network different from a network to which the PCs 6, 7 and 8 are connected, and the printers 2, 3 and 4 are connected both networks.

In the above-described illustrative embodiment, the server device 5 is configured to function as the LDAP server. The invention need not be limited to such a configuration, and the server device may be function as an SQL (Structured Query Language) server, or any other database server.

In the above-described embodiment, the invention is applied to a printer. It may be possible that the invention is applied to a MFP (Multi Function Peripheral) that is a single device having a functions of a printer, a scanner, a facsimile and the like, or the invention can be applied to any other image formation device.

What is claimed is:

1. An image formation system including an image formation device and a server device, connectable to each other through a network,
   wherein the image formation device comprises at least one processor and memory operatively coupled to the at least one processor, wherein the memory stores computer readable instructions that, when executed, cause the image formation device to:
   determine whether the server device is connected to the network upon connection of the image formation device to the network;
   transmit characteristic information to the server device if the server device is determined to be connected to the network, wherein the characteristic information includes an image formation characteristic of the image formation device and device information identifying the image formation device;

receive an image formation request from a terminal device through the network;

transmit request source information included in the image formation request, and the device information to the server device in response to receipt of the image formation request;

restrict an image formation process if a restriction instruction is received from the server device;

execute the image formation process in accordance with the image formation request if the restriction instruction is not received from the server device; and wherein the server device comprises a database, at least one processor and memory operatively coupled to the at least one processor, the database being configured to store predetermined restriction information regarding a predetermined image formation characteristic in association with each piece of at least part of the request source information, the memory storing computer readable instructions that, when executed, cause the server device to:

set the image formation characteristic represented by the characteristic information in correspondence with the device information in response to receipt of the characteristic information from the image formation device;

determine whether a predetermined restriction status associated with the request source information is satisfied for the image formation characteristic of the image formation device, if the request source information received from the image formation device is registered with the database; and transmit the restriction instruction to the image formation device in response to determining that the predetermined restriction status is satisfied.

2. The image formation system according to claim 1, wherein the server device includes a storage unit that stores the database.

3. The image formation system according to claim 1, wherein the restriction instruction inhibits image formation, and wherein the image formation device does not execute the image formation process when image formation is inhibited.

4. The image formation system according to claim 1, wherein the request source information of the terminal device includes one of a network address assigned to the terminal device and an address range including a network address assigned to the terminal device.

5. The image formation system according to claim 1, wherein the request source information of the terminal device includes a name assigned to the terminal device.

6. The image formation system according to claim 1, wherein the request source information includes a name assigned to a user of the terminal device.

7. The image formation system according to claim 1, wherein the first restriction status is satisfied when the request source information is registered with the database.

8. The image formation system according to claim 1, wherein the predetermined restriction status corresponds to a first predetermined restriction status registered with the database in relation to the request source information, and wherein the server transmits the restriction instruction when the first predetermined restriction is satisfied.

9. The image formation system according to claim 8, wherein the image formation device is configured to transmit an image formation feature included in the image formation request to the server device, wherein at least a second predetermined restriction status is registered with the database in relation to the image formation feature corresponding to the request source information, and wherein the server transmits the restriction instruction when the second predetermined restriction status is satisfied.

10. The image formation system according to claim 9, wherein the image formation feature includes a number of formed pages of images, and wherein an upper limit of the number of formed pages of the images is registered with the database as the second predetermined restriction status.

11. The image formation system according to claim 10, wherein the image formation feature includes a number of print colors of the image formation, and wherein the upper limit of the number of pages is registered with the database in relation to a predetermined number of print colors.

12. The image formation system according to claim 10, wherein the image formation feature includes a type of a recording medium, wherein the upper limit of the number of pages is registered in the database and specifically to a first predetermined type of recording medium, and wherein another upper limit of the number of pages is registered in the database and specifically to a second predetermined type of recording medium.

13. The image formation system according to claim 10, wherein the image formation device is further configured to transmit image formation result information to the server device, the image formation result information including the request source information, the image formation feature, and the number of formed pages of images, and wherein the server device is configured to update the upper limit of the number of pages based on the request source information, the image formation feature and the number of formed pages of images.

14. The image formation system according to claim 10, wherein the image formation device is further configured to transmit image formation result information to the server device, the image formation result information including the request source information, the image formation feature and the number of formed pages of images, wherein an accumulated number of formed pages of images is registered with the database in relation to the request source information, wherein the server device is configured to update the accumulated number of formed pages of images based on the request source information and the image formation feature, and wherein the server is configured to determine that the predetermined restriction status is satisfied when the sum of the accumulated number of formed pages of images and the number of formed pages of images included in the image formation result exceeds the upper limit.

15. The image formation system according to claim 1, wherein the predetermined restriction status includes an upper limit to a number of formed pages of images.

16. The image formation system according to claim 15,
wherein the image formation device is further configured to transmit image formation result information to the server device, the image formation result information including the request source information, the device information and the number of formed pages of images, and
wherein the server device is further configured to update the upper limit based on the request source information, the device information and the number of formed pages of images included in the image formation result information.

17. The image formation system according to claim 15,
wherein the image formation device is further configured to transmit image formation result information to the server device, the image formation result information including the request source information, the device information and the number of formed pages of images,
wherein an accumulated number of formed pages of images is registered with the database in relation to the request source information,
wherein the server device is further configured to update the accumulated number of formed pages of images based on the request source information, the device information and the number of formed pages of images included in the image formation result information, and
wherein the server is configured to determine that the predetermined restriction status is satisfied when the sum of the accumulated number of formed pages of images and the number of formed pages of images included in the image formation result exceeds the upper limit.

18. An image formation device configured to be connected to a server device through a network, the image formation device comprising:
at least one processor; and
memory operatively coupled to the at least one processor and storing computer readable instructions that, when executed, cause the image formation device to:
determine whether the server device is connected to the network upon connection of the image formation device to the network;
transmit characteristic information to the server device if the server device is determined to be connected to the network, wherein the characteristic information includes an image formation characteristic of the image formation device and device information identifying the image formation device;
receive an image formation request from a terminal device through the network;
transmit request source information included in the image formation request, and the device information to the server device in response to receipt of the image formation request;
restrict an image formation process if a restriction instruction is received from the server device; and
execute the image formation process in accordance with the image formation request if the restriction instruction is not received from the server device,
wherein the restriction instruction is received from the server device when a registration status of the request source information with respect to a database for storing the request source information satisfies at least one predetermined restriction status.

19. A server device configured to be connected to an image formation device through a network, wherein the server device comprises:
at least one processor; and
memory operatively coupled to the at least one processor and storing computer readable instructions that, when executed, cause the server device to:
set an image formation characteristic of the image formation device in correspondence with device information identifying the image formation device, wherein characteristic information including the image formation characteristic and the device information is transmitted to the server in response to the image formation device determining that the server device is connected to the network;
receive request source information from the image formation device, wherein the request source information corresponds to an image formation request received by the image formation device from a terminal device, the image formation request including a request to execute an image formation process at the image formation device;
determine whether a predetermined restriction status associated with the request source information is satisfied for the image formation characteristic of the image formation device, if the request source information received from the image formation device is registered with the database; and
transmit a restriction instruction to the image formation device in response to determining that the predetermined restriction status is satisfied, wherein the restriction instruction is configured to cause the image formation device to prevent execution of the image formation process.

20. One or more non-transitory computer readable media storing computer readable instructions that, when executed, cause an image formation device to:
determine whether the server device is connected to the network upon connection of the image formation device to the network;
transmit characteristic information to the server device if the server device is determined to be connected to the network, wherein the characteristic information includes an image formation characteristic of the image formation device and device information identifying the image formation device;
receive an image formation request from a terminal device through the network;
transmit request source information included in the image formation request, and the device information to the server device in response to receipt of the image formation request;
restrict an image formation process when the restriction instruction is received from the server device; and
execute the image formation process in accordance with the image formation request if the restriction instruction is not received from the server device,
wherein the restriction instruction is received from the server device when a registration status of the request source information with respect to a database for storing the request source information satisfies at least one predetermined status.

21. One or more non-transitory computer readable media storing computer readable instructions that, when executed, cause a server device to:
set an image formation characteristic of the image formation device in correspondence with device information identifying the image formation device, wherein characteristic information including the image formation characteristic and the device information is transmitted to the server in response to the image formation device determining that the server device is connected to the network;

receive request source information from an image formation device, wherein the request source information corresponds to an image formation request received by the image formation device from a terminal device, the image formation request including a request to execute an image formation process at the image formation device;

determine whether a predetermined restriction status associated with the request source information is satisfied for the image formation characteristic of the image formation device, if the request source information received from the image formation device is registered with the database; and transmit a restriction instruction to the image formation device in response to determining that the predetermined restriction status is satisfied, wherein the restriction instruction is configured to cause the image formation device to prevent execution of the image formation process.

* * * * *